United States Patent
Nathan et al.

(10) Patent No.: US 7,145,263 B2
(45) Date of Patent: Dec. 5, 2006

(54) AUTOMATIC HEADREST ADJUSTMENT CONTROL SYSTEM FOR A VEHICLE SEAT ASSEMBLY

(75) Inventors: John F. Nathan, White Lake, MI (US); David A. Hein, Sterling Heights, MI (US)

(73) Assignee: Lear Corporation, Southfield, MI (US)

( * ) Notice: Subject to any disclaimer, the term of this patent is extended or adjusted under 35 U.S.C. 154(b) by 400 days.

(21) Appl. No.: 10/280,171

(22) Filed: Oct. 25, 2002

(65) Prior Publication Data

US 2003/0090133 A1 May 15, 2003

Related U.S. Application Data

(60) Provisional application No. 60/341,039, filed on Oct. 30, 2001.

(51) Int. Cl.
*B60L 3/00* (2006.01)
*H02G 3/00* (2006.01)
*B60R 21/015* (2006.01)
*B60R 21/017* (2006.01)
*B60R 21/08* (2006.01)

(52) U.S. Cl. .................... 307/10.1; 180/271
(58) Field of Classification Search .............. 307/10.1; 180/271
See application file for complete search history.

(56) References Cited

U.S. PATENT DOCUMENTS

| | | | |
|---|---|---|---|
| 5,602,425 A | 2/1997 | Wilhelmi et al. ........... 307/10.1 |
| 5,694,320 A | 12/1997 | Breed | |
| 5,701,063 A * | 12/1997 | Cook et al. .................. 318/469 |
| 5,848,661 A | 12/1998 | Fu | |
| 6,024,378 A * | 2/2000 | Fu ................................ 280/735 |
| 6,042,145 A * | 3/2000 | Mitschelen et al. ......... 280/735 |
| 6,088,640 A | 7/2000 | Breed ........................... 701/45 |
| 6,199,900 B1 | 3/2001 | Zeigler | |
| 6,213,548 B1 | 4/2001 | VanWynsberghe | |
| 6,283,504 B1 | 9/2001 | Stanley et al. | |
| 6,402,195 B1 | 6/2002 | Eisenmann et al. | |
| 6,552,550 B1 * | 4/2003 | Karray et al. ................ 324/662 |
| 2001/0040065 A1 * | 11/2001 | Takagi et al. ................ 180/274 |
| 2001/0041952 A1 * | 11/2001 | Nada ............................ 701/22 |
| 2002/0128769 A1 * | 9/2002 | Der Ghazarian et al. ... 701/207 |

FOREIGN PATENT DOCUMENTS

DE 3925995 2/1991

(Continued)

OTHER PUBLICATIONS

Department of Transportation, National Highway Traffic Safety Administration 49 CFR Part 571 Federal Motor Vehicle Safety Standards; Head Restraints, 2000.

*Primary Examiner*—Brian Sircus
*Assistant Examiner*—Hal I. Kaplan
(74) *Attorney, Agent, or Firm*—Brooks Kushman P.C.

(57) ABSTRACT

A control system and method for automatically adjusting the position of a headrest of a seat assembly for a vehicle. The control system includes at least one occupancy sensor disposed within the seat assembly for detecting the presence of a passenger in the seat assembly and at least one passenger position sensor disposed proximate to the headrest for detecting the position of a passenger's head relative to the position of the headrest. A control module monitors the output of the at least one occupancy and position sensors and generates a control signal instructing the at least one drive motor to reposition the headrest to adjust to the presence and position of the passenger in the seat.

13 Claims, 4 Drawing Sheets

FOREIGN PATENT DOCUMENTS

| | | |
|---|---|---|
| DE | 4034544 | 5/1992 |
| DE | 19651670 | 2/1998 |
| DE | 10026383 | 1/2001 |
| DE | 10062511 | 6/2002 |
| JP | 110180200 | 7/1999 |

* cited by examiner

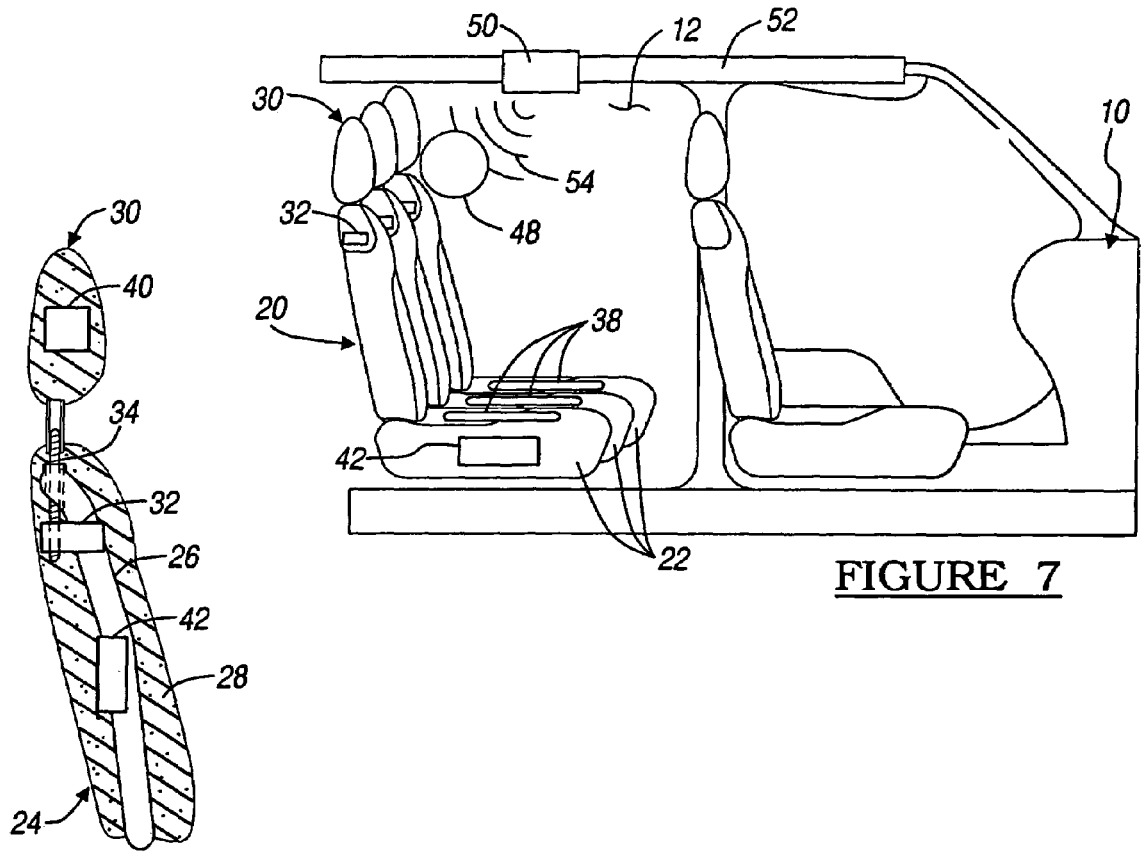
FIGURE 6
FIGURE 7
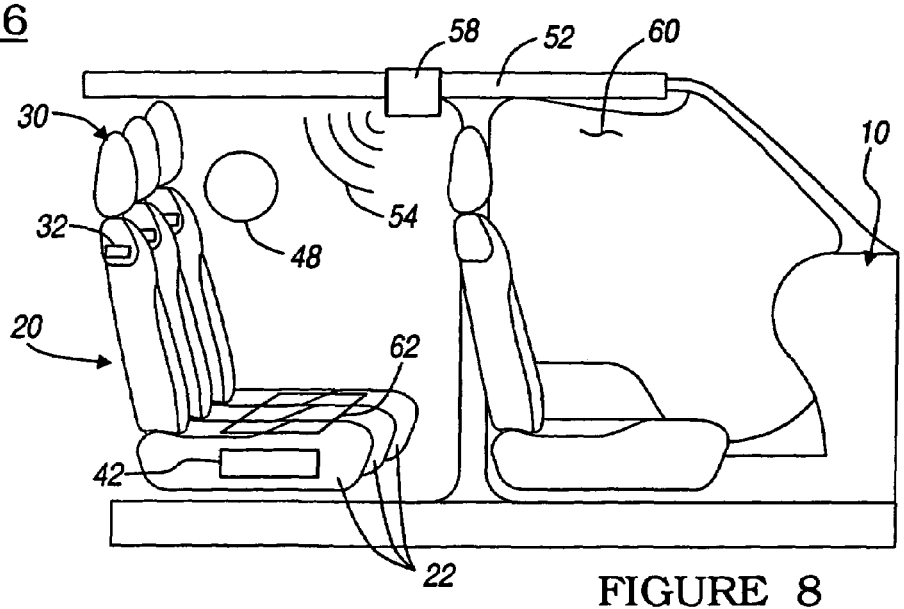
FIGURE 8

AUTOMATIC HEADREST ADJUSTMENT CONTROL SYSTEM FOR A VEHICLE SEAT ASSEMBLY

CROSS-REFERENCE TO RELATED APPLICATIONS

This application claims the benefit of U.S. provisional application Ser. No. 60/341,039 filed Oct. 30, 2001.

BACKGROUND OF THE INVENTION

1. Field of the Invention

The present invention relates to a system and method for automatically adjusting the position of a headrest of a vehicle seat assembly.

2. Background Art

Components of vehicle seat assemblies, including the seat cushion, seat back and headrest, are adjustable to a variety of user-defined seating positions to support a passenger in a vehicle. However, the adjustability of vehicle seat components, especially the headrest, are limited to systems that are adjusted by the vehicle occupant. The headrest assembly of the vehicle seat assembly extends upward from a top portion of the seat back of the vehicle seat adjacent the passenger's head to reduce the potential whiplash effect resulting from a rear impact collision.

Whiplash injuries are one of the most common injuries suffered by passengers in a vehicle. Whiplash is a general term for a set of common symptoms involving the soft tissues of the head, neck and spine, associated with the rapid motion of the head and neck. Typically, such whiplash injuries occur in rear impact vehicle collisions, wherein the forces generated by the vehicle collision accelerate the unsupported head and neck away from the restrained torso, causing significant body damage. The headrest is provided on the vehicle seat to restrict rearward travel of a passenger's head relative to the passenger's body during a collision.

One significant limitation of common headrest assemblies is that the headrests are manually positionable on the seat by the vehicle passenger, which may or may not protect passengers of different sizes who occupy the seat. For example, the headrest may not protect the head and neck of a tall passenger in a collision if a previous short passenger set the headrest at a lower height. A manually adjustable vehicle headrest may also obstruct the sight line of the driver through the rear window of a vehicle if not repositioned after use, creating a dangerous blind spot for the driver.

It would be advantageous to provide a vehicle seat assembly having a control system for automatically adjusting the position of the headrest based on the occupancy of a vehicle seat. It is also desirable to provide a vehicle seat assembly having an automatic headrest adjustment control system that positions the headrest adjacent a passenger's head in the event of a rear impact collision. It is further desirable to provide an automatic headrest adjustment control system that removes the headrest from view based on feedback from occupant detection sensors when a seat is unoccupied in the vehicle.

DISCLOSURE OF INVENTION

The present invention overcomes the above-referenced problems associated with prior vehicle seat assemblies by providing a system and method for automatically adjusting the position of a headrest of a vehicle seat assembly based on the presence and position of the passenger in the vehicle seat. The automatic headrest adjustment control system includes at least one occupancy sensor adapted to be disposed within the seat assembly to detect the presence of a passenger in the seat assembly. At least one passenger position sensor is adapted to detect the relative position of a passenger's head.

A control module is configured to communicate with the at least one occupancy sensor and at least one passenger position sensor to monitor the condition of the vehicle seat. The signal outputs of the at least one occupancy and position sensors are received and interpreted by the control logic of the control module. The control module generates a control signal instructing at least one drive motor adapted to be operatively connected to the headrest to reposition the headrest. If the control module detects the presence of a passenger in the seat, the control module will send a control signal to the at least one drive motor to position the headrest proximate to the passenger's head as determined by the at least one passenger position sensor output. If the at least one occupancy sensor does not detect the presence of a passenger, the control module generates an output signal to the at least one drive motor to adjust the headrest to a stored or inactive position to increase the visibility through the passenger compartment.

The above objects and other objects, features and advantages of the present invention are readily apparent from the following detailed description of the best mode for carrying out the invention when taken in connection with the accompanying drawings.

BRIEF DESCRIPTION OF THE DRAWINGS

FIG. 6 is a cross-sectional view of the seat back and headrest of the vehicle seat assemblies along line 6—6 of FIG. 2;

FIG. 7 shows a side elevational view of another aspect of the automatic headrest adjustment control system incorporated in a vehicle seating area of a passenger compartment of a vehicle;

FIG. 8 shows a side elevational view of yet another aspect of the automatic headrest adjustment control system incorporated in a vehicle seating area of a passenger compartment of a vehicle;

DETAILED DESCRIPTION OF THE PREFERRED EMBODIMENT(S)

Figure 1:
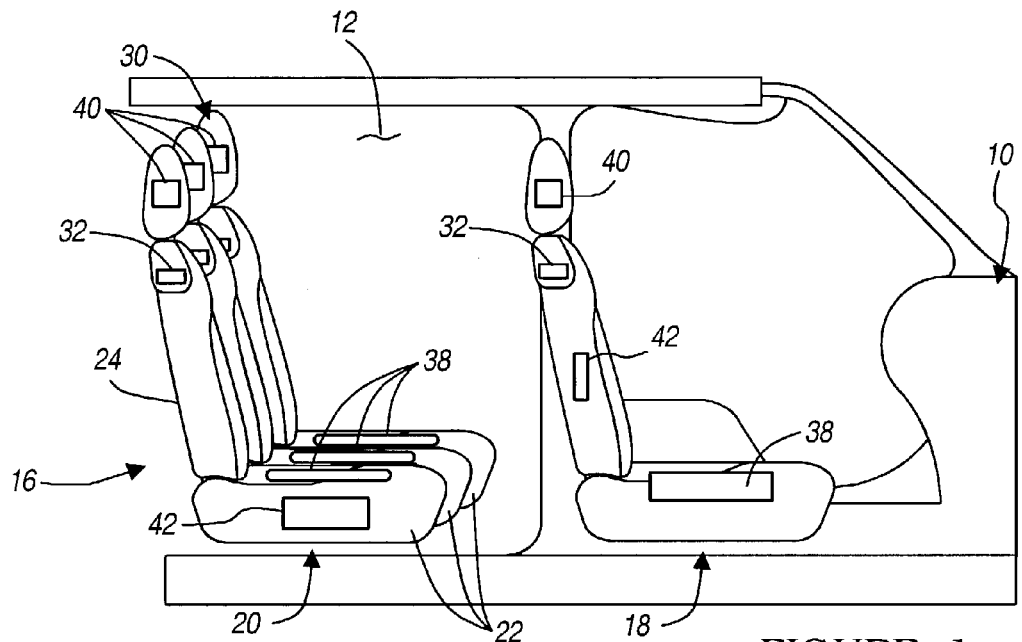
FIG. 1 shows a side elevational view of an automatic headrest adjustment control system incorporated in a vehicle seating area of a passenger compartment of a vehicle in accordance with the present invention.

Referring now to the Figures, FIG. 1 shows a motor vehicle 10 having an interior passenger seating compartment 12 having an automatic headrest adjustment control system. The control system is incorporated into a vehicle seat assembly 16 to provide passengers whiplash reduction protection in case of a vehicle collision. Vehicle seat assembly 16 is provided in passenger seating compartment 12 in a variety of seating arrangements, such as the front seat 18 of a vehicle, or, alternatively, as part of stand-alone or bench-type rear passenger seats 20.

Referring now to FIGS. 2–5, an automatic headrest adjustment control system is incorporated in vehicle seat assembly 16. Seat assembly 16 includes a seat bottom 22 and a seat back 24 extending generally vertically therefrom. The seat bottom 22 can be of various constructions but generally includes a structural frame covered by a foam pad layer or cushion surrounded by an outer finish cover material. The structural frame (not shown) of seat bottom 22 is secured to the floor or a support on the floor of the passenger compartment 12 of vehicle 10. For example, in a front passenger vehicle seat, the structural frame is coupled to a pair of rails mounted to the floor of the vehicle allowing the seat bottom 22 to be selectively positioned on the rails. A rear vehicle seat may be mounted directly to the vehicle floor or a support structure in a stationary position.

Referring additionally to FIG. 6, seat back 24 includes a frame 26 having a foam pad layer or cushion 28 mounted thereon. Frame 26 is pivotally mounted to the structural frame of the seat bottom 22 which may permit the passenger to adjust the seat back 24 relative to the seat bottom 22. A headrest 30 is coupled to the frame 26 of seat back 24 and extends generally vertically above and adjacent to an upper portion of the seat back 24. At least one drive motor 32 is operatively connected to the headrest 30 to position headrest 30 relative to the seat back 24. Alternatively, a drive mechanism 34 coupled to the seat back frame 26 and headrest 30 cooperates with drive motor 32 to position the headrest 30 relative to the seat back 24. Drive motor 32 is activated by a signal from a control module 42 in response to data received from at least one headrest passenger position sensor 40. A description of the control module 42 of control system 14 will be provided in greater detail below.

Referring back to FIGS. 2 through 5, at least one occupancy detection sensor 38 is disposed adjacent to or within the vehicle seat assembly 16 to detect the presence and position of a passenger in the vehicle seat. A variety of sensor types may be used in combination with the vehicle seat assembly to detect occupancy in the vehicle seat. For example, the at least one occupancy detection sensor 36 may include a mechanical pressure, capacitive or strain gauge-type sensor disposed within the seat bottom 22 or seat back 24 in each of the vehicle seats 16. Alternatively, a pressure sensing mat may be provided on and through the upper surfaces of either the seat bottom 22 or seat back 24.

In a first embodiment of the present invention, headrest passenger position sensor 40 is provided in each headrest 30 to detect the presence and position of a passenger in the vehicle seat 16. Headrest sensor 40 is in communication with and is monitored by a control module 42. A variety of headrest sensors may be used to detect the remote presence of an occupant within proximity of the sensor 40. For example, headrest sensor 40 may be an electromagnetic, capacitive, ultrasonic, optical (infrared) or radio wave sensor disposed adjacent a forward facing portion 44 of the headrest 30.

The sensor transmits and receives a signal 46 to determine the presence of a passenger's head 48 proximate to the headrest 30. If the passenger's head 48 is disposed in proximity of the headrest 30, the headrest sensor 40 will transmit data relating to the position of the passenger's head 48 to the control module 42. It should be understood that the control module 42 may be incorporated into either the seat bottom, seat back or headrest of the vehicle seat assembly 16, coupled with drive motor 32 or headrest sensor 40 or externally stored from the vehicle seat 16.

Referring back to FIG. 1, a first sensing arrangement for the automatic headrest adjustment control system of the present invention is illustrated. In one aspect of the present invention, at least one occupancy sensor 38 is incorporated into each of the seat bottom cushions 22 of a rear seating area 20 to detect the presence of a passenger in the vehicle seats 16. A headrest passenger position sensor 40 is disposed within each headrest 30 of the rear seating area 20 to monitor and detect the presence of a passenger's head 48 in an area proximate to the forward facing portion 44 of the headrest 30. The control module 42 is in communication with each of the occupancy sensors 38 and headrest sensors 40. Alternatively, each vehicle seat 16 may have a control module which communicate with a central control module to monitor the presence and location of passengers in the passenger compartment 12 of vehicle 10.

Referring now to FIG. 7, another aspect of the automatic headrest adjustment control system of the present invention is illustrated. Similar components of control system 14 in FIG. 1 have similar reference numerals in FIGS. 7 and 8. Control system includes at least one occupancy detection sensor 38 provided in each seat bottom 22 of the rear seating area 20 to detect the presence of a passenger in the seat. At least one passenger position sensor 50 is disposed directly above each headrest 30 in the headliner 52 of the passenger compartment 12 of vehicle 10 and generates a signal 54 to detect the position of the passenger's head 48 in the rear seating area 20.

Each occupancy detection sensor 38 and passenger position sensor 50 is in communication with the control module 42 and transmits data relative to the position of the passenger in the rear seating area 20 for adjustment of the headrest relative to passenger position. Passenger position sensors 50 may include an electromagnetic, capacitive, optical (infrared) or radio wave (ultrasonic) sensor to detect the passenger's head 48 in proximity to headrest 30. Control module 42 transmits a signal to drive motor 32 to adjust the position of headrest 30 proximate to the passenger's head 48 to prevent injury in case of a vehicle collision.

In another aspect of the automatic headrest adjustment control system of the present invention illustrated in FIG. 8, at least one passenger position detection sensor 58 is positioned in the headliner 52 of the vehicle 10 adjacent a rear portion of the front passenger compartment 60. A single occupancy detection sensor or mat 62 extends across and through all rear seat bottom cushions 22 of rear seating area 20 to detect the presence and location of passengers in any of the seats.

Control module 42 is in communication with the at least one passenger position sensor 58 and occupancy detection sensor mat 62 to determine the presence of a passenger in the rear seating area 20 as well as the position of the passenger's head 48 to adjust the location of headrest 30. Passenger position detection sensor 58 generates a signal 54 to determine the position of the passenger's head 64 in proximity to the headrest 30 of rear seating area 20. Control module 42 transmits a signal to the drive motor 32 to adjust the position of the headrest 30 adjacent the passenger's head 64 48 based on data received from passenger position sensors 58 and occupancy detection sensor mat 62.

It is understood that a variety of sensing arrangements can be combined with one another to perform the desired functions. For example, a single occupancy detection sensor mat 62 incorporated across and through all rear seat bottoms 22 as illustrated in FIG. 8 may be incorporated with the one or more headrest sensors 40 provided in the headrest 30 illustrated in FIG. 1 or the passenger position detection sensors 50 incorporated in the headliner 52 as illustrated in FIG. 7. It is also understood that passenger position detection sensors 50 and 58 may be modified for use with a front passenger seat 16 in a front passenger seating compartment 60.

Figure 9:
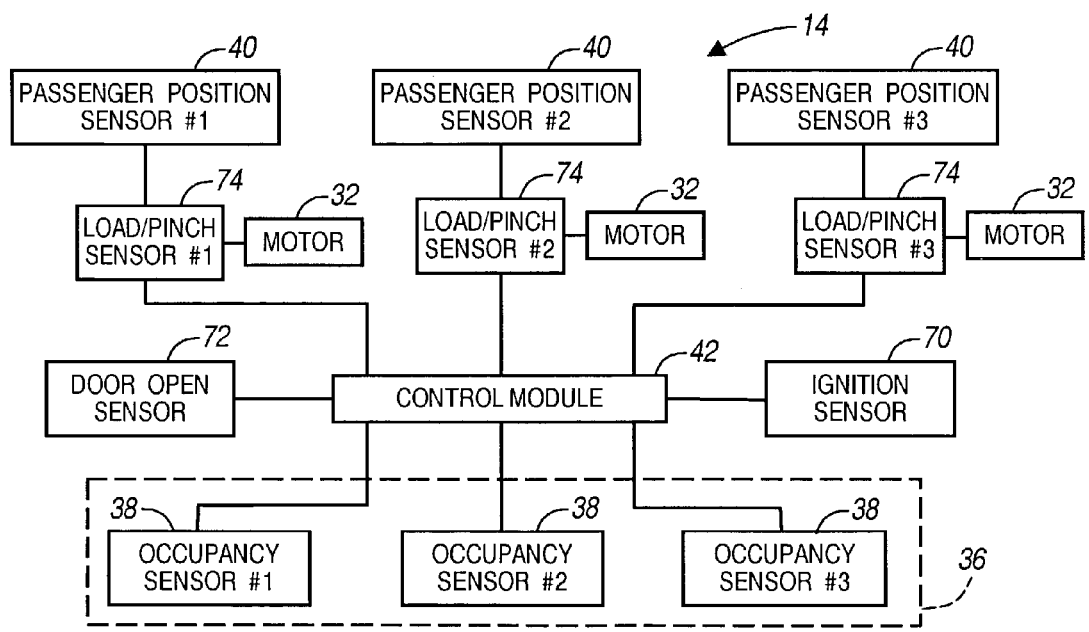
FIG. 9 illustrates a schematic representation of the automatic headrest adjustment control system of the present invention.

Referring now to FIG. 9, a schematic illustration of the automatic headrest adjustment control system 14 of the present invention is shown. FIG. 9 illustrates a typical three seat rear seating arrangement for a passenger compartment of a vehicle. It is understood that one or more vehicle seats may be monitored by a single control module 42. Alternatively, individual control modules may be provided in each vehicle seat to monitor occupancy sensors 38 and passenger position sensors 40, thereby communicating with a central control module 42.

Control module 42 is operatively connected to an ignition sensor 70 and one or more door open sensors 72. Control module 42 monitors the at least one occupancy sensor 38 and the at least one passenger position sensor, such as headrest sensors 40 or passenger position detection sensors 50, 58 as illustrated in FIGS. 7 and 8. The control logic of control module 42 interprets vehicle, seat occupancy and passenger proximity conditions to automatically adjust the position of the headrest. The control logic methodology of control module 42 will be described below in greater detail.

Figure 2:
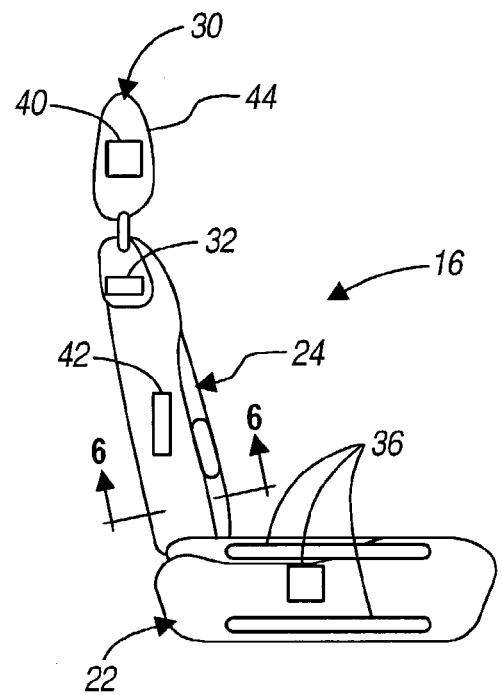
FIG. 2 shows a side elevational view of a vehicle seat assembly having an automatic headrest height adjustment control system in accordance with the present invention.
Figure 3:
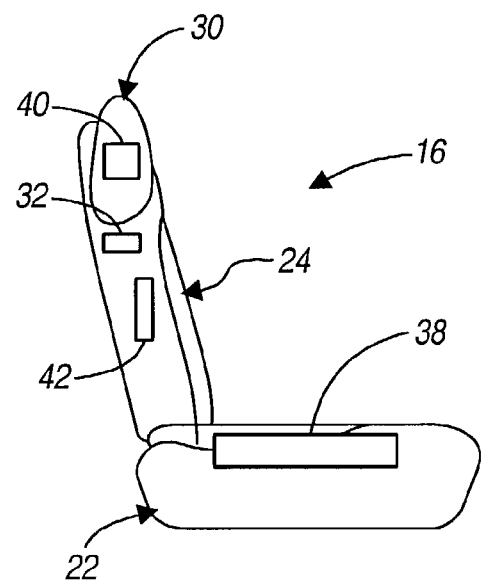
FIG. 3 shows a side elevational view of the vehicle seat assembly with the headrest positioned in the unoccupied seat position.

In one aspect of the invention, control module 42 is activated upon detection of a door open operation signal generated by door open sensor 72. Upon activation of the control module 42, the control module 42 activates the headrest motor 32 to position the headrest 30 to a position that allows easy passenger entry into the vehicle. This position is illustrated in FIG. 2. When control module 42 detects the ignition sensor 70 to be activated and the seat to be unoccupied using occupancy detection sensors 38, the control module 42 adjusts the headrest 30 to the unoccupied state FIG. 3 using headrest motor 32. The unoccupied seat position, illustrated in FIG.3, removes headrest 30 from the line of sight of the driver, allowing optimal vision through the rear or side window area of the vehicle 10. The headrest 30 may either be lowered into a cavity within the seat back 24 or, alternatively, may be folded forward or rearward.

Figure 4:
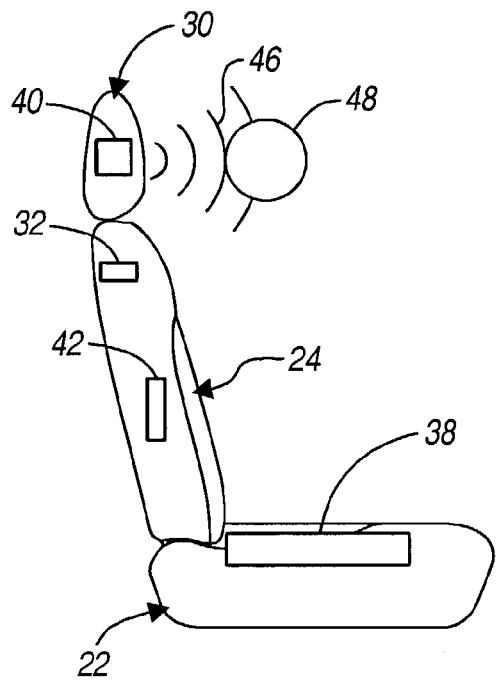
FIG. 4 shows a side elevational view of the vehicle seat assembly with the headrest positioned in a first occupied seat position.
Figure 5:
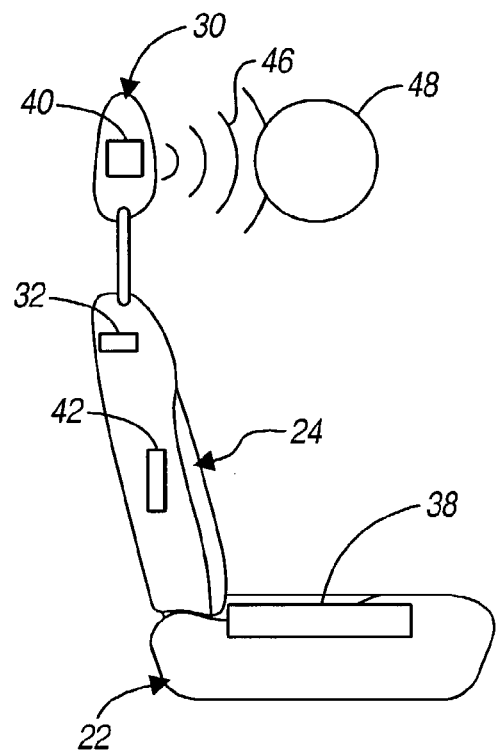
FIG. 5 shows a side elevational view of the vehicle seat assembly with the headrest positioned in a second occupied seat position.

If the occupancy sensors 38 detect the presence of a passenger in the seat 16, control module 42 will monitor the conditions of ignition sensor 70 and door open sensor 72. When ignition sensor 70 is activated and door open sensor 72 detects a closed door condition, control module 42 will activate drive motor 32 to position the headrest 30 to a predefined raised position. The predefined raised headrest position is preferably in accordance with the minimum height requirements for a passenger, satisfying ECE 17.05 regulations for European vehicles, as is illustrated in FIG. 5. If the predetermined factory headrest position does not provide optimal protection for a passenger's head, the control module 42 will instruct drive motor 32 to reposition the headrest 30 to a position adjacent the passenger's head 48 based on the data received from either the headrest sensor 40, as is illustrated in FIG. 4, or alternatively, passenger position detection sensors 50 or 58 as illustrated in FIGS. 7 and 8.

The control module 42 monitors drive motor 32 with a pinch or load sensor 74. Load sensor 74 detects fluctuations in drive motor output to detect an obstruction or blockage in the path of the moving headrest 30. Load sensor 74 may include a current, voltage or PWM sensor, which is coupled to the drive motor 32 to prevent passenger injury resulting from a blocking or pinching condition. If a pinch condition is detected by load sensor 74, the control module 42 instructs drive motor 32 to stop positioning of the headrest 30 and may reverse the direction of drive motor 32 to prevent the blocking or pinching conditions. Alternatively, drive motor 32 may include a limit mechanism which will stop the automatic positioning of headrest 30 if a force exerted by the motor exceeds a maximum force tolerance.

Figure 10:
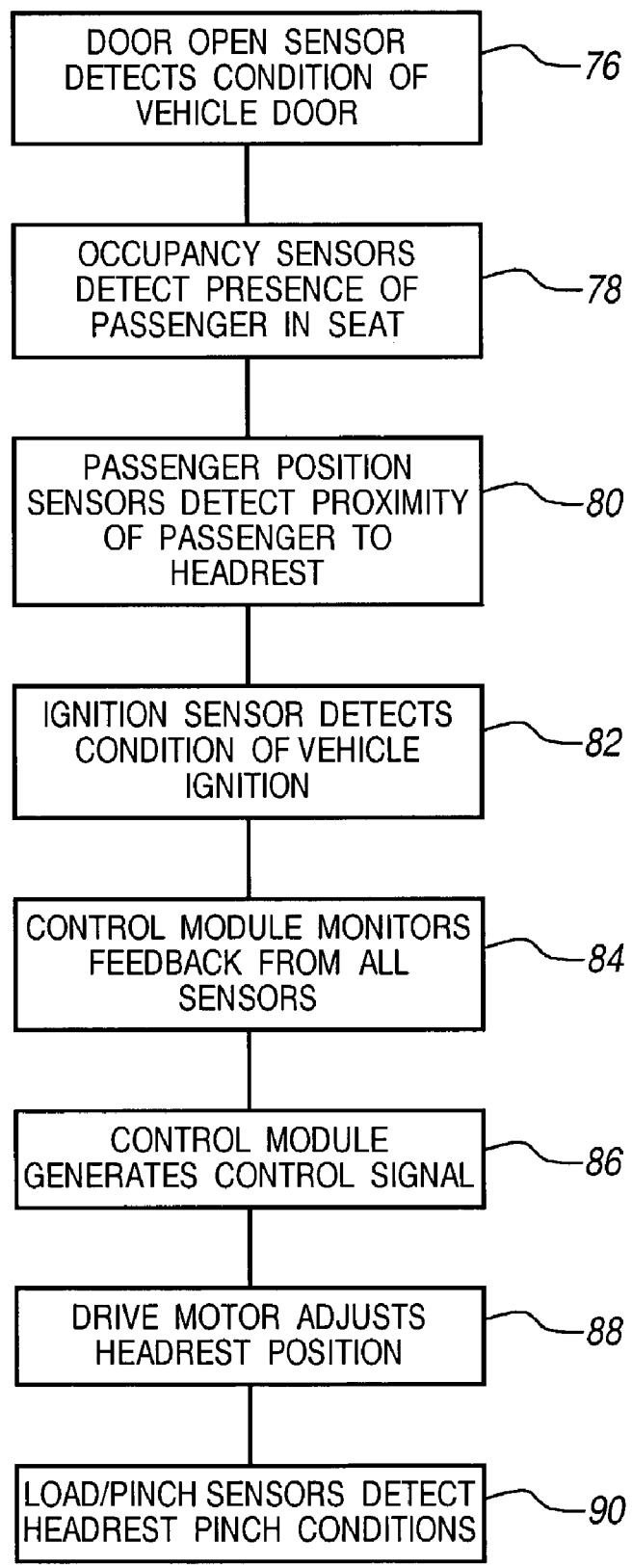
FIG. 10 is a flowchart illustrating a method of automatically adjusting the position of the headrest of a vehicle seat assembly in accordance with the present invention.

Referring now to FIG. 10, the control logic methodology of the control module 42 for automatically adjusting the position of the headrest of a vehicle seat assembly of the present invention is discussed in greater detail. Control logic of control module 42 monitors output signals from sensors disposed both in the vehicle seat assembly and provided throughout the vehicle and generates control signals to instruct the at least one drive motor to position the headrest according to sensed conditions. It is understood that the control logic of control module 42 may perform its function based solely on outputs from occupancy sensors 78 and passenger position sensors 80, or alternatively, by monitoring the outputs of door open sensors 76, ignition sensors 82 and load/pinch sensors 90.

As is illustrated in the block diagram in FIG. 10, at least one door open sensor is provided which is in communication with the control module. The at least one door open sensor monitors 76 the position or condition of the vehicle door to determine if the door is open or closed and transmits an output signal to the control module 84. At least one occupancy sensor in communication with the control module is provided in the seat assembly, either disposed within the seat bottom or seat back cushions of the seat. The at least one occupancy sensor monitors 78 the seat bottom or seat back of the seat assembly and generates an output signal for the control module 84 when the passenger presence condition changes.

At least one passenger position sensor in communication with the control module is provided proximate the headrest of the seat assembly, either provided within the headrest or in the headliner of the vehicle proximate the headrest. The at least one passenger position sensor monitors 80 the area proximate the headrest and generates an output signal for the control module 84 when the presence of a passenger's head in proximity of the headrest is sensed. An ignition sensor is in communication with the control module and monitors 82 the ignition condition of the vehicle.

The control logic of the control module 84 monitors the feedback from all connected sensors and generates 86 a control signal instructing the at least one drive motor to adjust 88 the position the headrest based on detected passenger conditions described above between at least one predefined headrest position in proximity to the passenger's head and a stored position adjacent the upper portion of the seat back to optimize viewing area through the passenger compartment of the vehicle. At least one load or pinch sensor is in communication with the control module and monitors 90 the activity of the at least one drive motor to detect a pinch condition during the positioning of the headrest. The control module will instruct the at least one drive motor to stop or reverse the positioning of the headrest if the load/pinch sensor detects a pinch condition.

While the embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A seat assembly for use in a passenger compartment of a vehicle, the seat assembly comprising:
    a seat bottom;
    a seat back mounted to the seat bottom;
    a headrest adjustably connected to and disposed adjacent an upper portion of the seat back; and
    an automatic headrest adjustment control system, the control system including at least one occupancy sensor disposed within the seat bottom for detecting the presence of a passenger in the seat assembly, wherein the at least one occupancy sensor is a single sensor mat extending through and across multiple adjacent seat bottom cushions to detect the presence of a passenger in the seat assembly;
    at least one passenger position sensor disposed proximate to the headrest for detecting the position of a passenger's head relative to the position of the headrest,
    a control module in communication with the at least one occupancy sensor and the at least one passenger position sensor for receiving output signals of the sensors, wherein the control module generates a control signal to position the headrest based on the output signals, and
    at least one drive motor operatively connected to the headrest for positioning the headrest based on the control signal received from the control module.

2. The seat assembly of claim 1 further comprising at least one load sensor in communication with the control module for monitoring the at least one drive motor and detecting a pinch condition during the positioning of the headrest.

3. The seat assembly of claim 1 wherein the control system further comprises an ignition sensor configured to communicate with the control module for monitoring the ignition condition of the vehicle.

4. The seat assembly of claim 1 wherein the control system further comprises a door open sensor configured to communicate with the control module for monitoring the condition of the vehicle doors.

5. The seat assembly of claim 1 wherein the at least one passenger position sensor comprises a sensor disposed within the headrest for detecting the position of the passenger's head in proximity to the headrest.

6. The seat assembly of claim 1 wherein the at least one passenger position sensor comprises at least one sensor adapted to be mounted in a headliner of the vehicle above the headrest for detecting the position of the passenger's head in proximity to the headrest.

7. The seat assembly of claim 1 wherein the control module generates an output signal instructing the at least one drive motor to position the headrest in proximity to the passenger's head based on output received from the at least one passenger position sensor if the at least one occupancy sensor detects the presence of the passenger in the seat assembly, the ignition sensor detects an active condition and the door open sensor detects a closed position.

8. The seat assembly of claim 1 wherein the control module generates an output signal instructing the at least one drive motor to position the headrest in a stored position if the at least one occupancy sensor does not detect the presence of the passenger in the seat assembly.

9. A method of automatically adjusting the position of a headrest of a vehicle seat assembly, the method comprising:
    monitoring output signals from a single sensor mat extending through and across multiple adjacent seat bottom cushions to detect the presence of a passenger in the seat assembly and at least one passenger position sensor adapted to be mounted in a headliner of the vehicle above the headrest to detect the presence and position of a passenger's head in the vehicle seat assembly;
    generating a control signal based on the output signals for instructing at least one drive motor to position the headrest; and
    positioning the headrest with the at least one drive motor based on the control signal between at least one position in proximity to the passenger's head and a stored position.

10. The method of claim 9 further comprising the step of monitoring the at least one drive motor for detecting a pinch condition during the positioning of the headrest.

11. The method of claim 9 further comprising the step of monitoring the ignition condition of the vehicle, wherein the step of generating the control signal includes generating the control signal based on the ignition condition detected by an ignition sensor.

12. The method of claim 9 further comprising the step of monitoring the position of a vehicle door, wherein the step of generating the control signal includes generating the control signal based on the position of the vehicle door detected by at least one door open sensor.

13. The control system of claim 1 wherein the at least one occupancy sensor comprises a single sensor mat extending through and across multiple adjacent seat bottom cushions to detect the presence of a passenger in the seat assembly.

* * * * *